Patented Apr. 8, 1924.

1,489,692

UNITED STATES PATENT OFFICE.

GUIDO BLENIO, OF NEW YORK, N. Y.

FIRE-EXTINGUISHING COMPOSITION.

No Drawing. Application filed January 23, 1922. Serial No. 531,283.

*To all whom it may concern:*

Be it known that I, GUIDO BLENIO, a citizen of the United States, residing at New York, county of New York, and State of New York, have made a certain new and useful Invention in Fire-Extinguishing Compositions, of which the following is a specification.

This invention relates to that class of fire extinguishing compositions, or chemicals, which depend for effectiveness principally upon the liberation of large volumes of oxygen-excluding gas and entrapping this gas in a highly viscous medium to thereby retain said gas within the effective zone.

One of the prime objects, therefore, of my invention includes the preparation and production of a composition, or compositions, which will, under controllable conditions, quickly and effectively liberate large volumes of the desired non-combustible gas and which gas will entrain the prepared, or resulting, viscous medium and reaction product.

A further object includes the production of a fire-extinguishing compound of the nature set forth above, which may be cheaply manufactured, is readily stored, constantly ready for use and which, above all things, is always positive and effective in action.

A still further object of my invention embraces the production of a foam producing fire-extinguishing material, or composition, which possesses the herein stated requisites, and which, after long periods of experiments, I have found to be highly effective in reducing fire risks to a minimum in even such dangerous combustibles as oils, benzine, benzol, naphtha, ether, alcohol, turpentine, waste paper, cotton waste and the like.

It has heretofore been proposed to use sulfite liquor, neutralized, or in combination with calcium carbonate, as a foam producing agent for a fire extinguishing composition. But in all cases where calcium carbonate has been employed, the composition has proven unsuccessful.

I have found that by proper treatment of the sulfite liquor, a suitable and effective gas entrapping agent may be produced which, when brought into contact with a gas producing or secondary agent, will almost instantly, and at the time of need, cause the production of a foaming non-inflammable mass. By reason of the high gas pressure produced, and the character of the entrained liquid, it is possible to effectively project this seething fire-choking mass onto the flames, or to throw it over the burning material to thus quickly and completely smother the flames by choking off the supply of oxygen, or by blanketing the combustible material.

I have found that sulfite liquor, properly prepared, lends itself admirably as the principal re-agent or prime composition of my fire extinguisher. This material may be in the liquid form, or it may, for convenience in shipping and handling, be evaporated to dryness. In either case, I insure, or increase, its acidity, viscosity and blanketing qualities by the addition of a proper amount of aluminum sulfate. The quantity of aluminum sulfate to be added depends largely upon the condition of the sulfite liquor used, and upon the quantity of neutralizing re-agent to be employed, that is, upon the character of the fire-extinguishing composition to be produced. As a greater blanketing effect is obtained with increased proportion of the acid sulfate and neutralizing, or foam producing agent, these re-agents may be greatly increased for special purposes.

As a practical illustration, without, however, thus limiting myself, for the ordinary fire extinguishing composition, I use one and one-half parts, by measure, of the commercial aluminum sulfate to one part of the evaporated, and preferably, though not necessarily, powdered sulfite liquor. This composition is thoroughly mixed and forms my principal re-agent, possessing the above stated desirable qualities when the same has been dissolved in water to, preferably, a creamy or syrupy consistency. Usually, though not necessarily, this re-agent is kept in a suitable container in solution for instant use in the manner stated below.

This composition is also admirably adapted for a "primer" or under coating on plastered walls and wood or other surfaces, prior to painting. In either case it is important to guard against contamination by alkalies or alkaline substances, or carbonates, as the addition of the same "kills" the material and its effectiveness for the purpose stated.

As my active re-agent or basic gas producing and entraining medium or secondary compound I use sodium bicarbonate, or its equivalent, either in the dry form or in solution. In all cases, however, where the re-agents (either one or both) are in solution, will it be absolutely necessary to keep them in separate containers, and these containers are so arranged that the re-agents are automatically brought into intimate contact at or just prior to application.

Under certain conditions it may be desirable to store the fire extinguishing compositions in the dry form in position for immediate use, or it may be to an advantage to have the primary composition in proper solution and at the time of application cause the basic re-agent to be automatically added thereto, either in the dry state or in solution. The former case is desirable where storage space is limited, or where a sprinkler system has been installed. The latter case is admirably suited for use in hand grenades, for example, and in small chemical apparatus. For immediate use, however, I prefer to have both the re-active compositions in solution, and so stored that immediate mixing results either automatically, as when a two compartment container is turned upside down, or by suitable mixing and applying apparatus.

Where both the re-agents are in solution, and where the primary re-agent is diluted to a syrupy consistency, the basic re-agent should be dissolved in water to a specific gravity of from 10 to 20° Baumé, and a sufficient quantity of the basic re-agent is used to produce an ample supply of carbonic acid gas bubbles or to fully neutralize the acid content of the primary re-agent.

From the above disclosure, it is apparent that the mode of application of my fire extinguishing composition may differ considerably, and that the relative proportions of the re-agents may also vary as occasion requires. And while I have described a specific embodiment of my invention, and named the ingredients best suited for producing my fire extinguishing composition, I do not thereby desire to be understood as thus unnecessarily limiting myself.

What I claim, therefore, as new and useful, and of my own invention, and desire to secure by Letters Patent, is:

1. As a fire extinguishing component, a composition comprising a sulfite liquor and aluminum sulfate in proportion of 2 to 3 parts, and dissolved in water to a creamy consistency.

2. A creamy composition comprising a concentrated sulfite liquor containing aluminum sulfate.

3. A creamy composition comprising a concentrated sulfite liquor containing aluminum sulfate in a ratio of 2 parts of the former to 3 parts of the latter.

In testimony whereof I have hereunto set my hand on this 20th day of January A. D., 1922.

GUIDO BLENIO.